United States Patent
Ishii et al.

(10) Patent No.: US 7,256,552 B2
(45) Date of Patent: Aug. 14, 2007

(54) LED CONTROL CIRCUIT

(75) Inventors: Takaaki Ishii, Osaka (JP); Nobuyuki Ohtaka, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 1 day.

(21) Appl. No.: 11/199,710

(22) Filed: Aug. 9, 2005

(65) Prior Publication Data
US 2006/0033443 A1   Feb. 16, 2006

(30) Foreign Application Priority Data
Aug. 11, 2004   (JP)   ............... 2004-234070

(51) Int. Cl.
G01G 3/10   (2006.01)
G01G 5/02   (2006.01)
(52) U.S. Cl. .................. 315/169.2; 345/600
(58) Field of Classification Search ............ 315/169.1, 315/169.3, 169.2, 169.4; 345/589, 593, 600, 345/601, 602
See application file for complete search history.

(56) References Cited
U.S. PATENT DOCUMENTS
6,317,138 B1 * 11/2001 Yano et al. ............. 345/589
6,472,946 B2 * 10/2002 Takagi ..................... 332/109
6,577,287 B2 *  6/2003 Havel ....................... 345/83
6,646,654 B2 * 11/2003 Takagi ..................... 345/690

* cited by examiner

Primary Examiner—Shih-Chao Chen
Assistant Examiner—Minh Dieu A
(74) Attorney, Agent, or Firm—Osha Liang LLP

(57) ABSTRACT

An LED control circuit for controlling a plurality of LEDs with different emission colors comprises a counter which increments or decrements a count value at a predetermined clock in response to a count start signal externally supplied, a signal conversion circuit which converts the count value into an analog signal displaying intensity corresponding to the count value and outputs the analog signal as an output signal, a signal generation circuit which generates, based on the output signal from the signal conversion circuit and brightness data externally specified to its corresponding LED, an analog signal displaying intensity corresponding to a product of the output signal and the brightness data, and a driving circuit which drives its corresponding LED according to the analog signal output from the signal generation circuit, to gradually and simultaneously change the brightness of the LEDs in accordance with the count value.

6 Claims, 14 Drawing Sheets

LED CONTROL CIRCUIT

The entire disclosure of Japanese Patent Application No. 2004-234070, including the specification, claims, drawings, and abstract, is incorporated herein by reference.

BACKGROUND OF THE INVENTION

1. Field of the Invention

The present invention relates to an LED control circuit for controlling a plurality of LEDs with different emission colors, and in particular to controlling the brightness of an LED.

2. Description of the Related Art

By using a combination of red (R), green (G), and blue (B) LEDs, i.e. three primary color LEDs, and adjusting the brightness of the LEDs, various emission colors can be produced. Such three color LEDs are incorporated in, for example, cellular and PHS mobile phones. In a cellular phone, for example, upon receipt of an incoming call or a text massage, a corresponding color light is emitted to notify a user of the receipt. As a method of realizing multicolor multi-gradation display using three color LEDs, there has been known a PWM (Pulse Width Modulation) method in which gradation of brightness of LEDs is controlled by adjusting each duty factor of pulsed voltages applied to the LEDs.

FIG. 13 shows an example of a conventional LED control circuit 100 for modulating the brightness of three color LEDs 1r, 1g, and 1b according to the PWM method. In FIG. 13, the LED control circuit 100 is connected at its input terminal to a microcomputer (micon) 200 and connected at its output terminals to the three color LEDs 1r, 1g, and 1b.

To cause the three color LEDs 1r, 1g, and 1b to enter into their respective desired lighting states, the micon 200 generates a serial data signal SDATA and supplies the serial data signal SDATA to the LED control circuit 100.

In the LED control circuit 100, a serial I/F 110 specifies various setting values in registers 121 to 127 based on the serial data signal SDATA supplied from the micon 200. Specifically, an ON-OFF setting value for turning the LEDs 1r, 1g, and 1b ON or OFF is set in the register 121, and turn-on position setting values for the LEDs 1r, 1g, and 1b are set in the registers 122, 124, and 126, respectively. Turn-off position setting values for the LEDs 1r, 1g, and 1b are set in the registers 123, 125, and 127. The turn-on position setting values define a start position of the ON period in one PWM cycle (for example, 128 of the clock count), while the turn-off position setting values define a start position of OFF period in one PWM cycle. Therefore, the duty factor of the pulsed voltage is determined by the turn-on position setting values and the turn-off position setting values.

A PWM driving circuit 141 generates a PWM signal having a desired duty factor based on the turn-on and turn-off position setting values established in the registers 122 and 123 using a clock signal for PWM generated by a counter 130. When the ON-OFF setting value for the LED 1r specified in the register 121 is "ON", the generated PWM signal is applied via an amplifier 151 to one terminal of the LED 1r, thereby causing the LED 1r to emit light at a brightness level in accordance with the duty factor of the PWM signal.

Similarly, a PWM driving circuit 142 generates a PWM signal based on the setting values in the registers 124 and 125. Then, when the ON-OFF setting value for the LED 1g specified in the register 121 is "ON", the generated PWM signal is applied via an amplifier 152 to one terminal of the LED 1g. Further, a PWM driving circuit 143 generates a PWM signal based on the setting values in the registers 126 and 127. When the ON-OFF setting value for the LED 1b specified in the register 121 is "ON", the generated PWM signal is applied via an amplifier 153 to one terminal of the LED 1b.

The LEDs 1r, 1g, and 1b are connected at their anodes to a power source Vdd and connected at their cathodes to the amplifiers 151, 152, and 153, and configured to emit light when currents are drawn into the amplifiers 151, 152, and 153.

In the LED control circuit 100 shown in FIG. 13, by individually changing the turn-on and turn-off position setting values for each of the LEDs 1r, 1g, and 1b, the LEDs 1r, 1g, and 1b can differ in brightness level from each other, which enables provision of various emission colors.

In recent years, there has been a growing demand for fade-in and fade-out functions in which the brightness level gradually increases when an LED is turned on and gradually decreases when the LED is turned off. These functions are implemented in the LED control circuit 100 shown in FIG. 13 by gradually extending the ON period for PWM to enable a fade-in, and gradually reducing the OFF period for PWM to enable a fade-out. Specifically, in a state wherein the turn-on position setting value in the register 122 is set at "0", the turn-off position setting value in the register 123 is increased from "0" to "50" by one, to thereby enable gradual increase in brightness of the LED 1r from 0/128th gradation level (turned-off state) to 50/128th gradation level.

FIG. 14 shows a fade-in and a fade-out achieved in a conventional manner. In FIG. 14, the abscissa represents time and the ordinate represents a duty factor of a PWM signal. In addition, a brightness setting value for the LED 1r (a duty factor in a normal lighting state) is set to "80/128", while the brightness setting value for the LED 1g is set to "40/128". On the other hand, the LED 1b is set to the "OFF" state.

With the above-described settings, when fade-ins, for example, of the LED 1r and the LED 1g are simultaneously started, as shown in FIG. 14, the LED 1g reaches the established brightness setting value ahead of the LED 1r, and thereafter brightness of only the LED 1r changes alone. Further, when fade-outs are simultaneously started, for example, the LED 1g reaches the turned off state (a condition where the duty factor is zero) ahead of the LED 1r, which results in a situation that only the LED 1r thereafter remains turned on.

Accordingly, in the conventional manner, when a plurality of LEDs have different brightness setting values, the brightness ratio of the plurality of LEDs could be diverted greatly from a desired brightness ratio in the course of fading in or fading out. In other words, it is not possible to perform fade-in and fade-out operation of desired halftone color light.

SUMMARY OF THE INVENTION

In consideration of the above, the present invention advantageously provides an LED control circuit for controlling a plurality of LEDs with different emission colors comprising, with respect to each of the plurality of LEDs, a counter which increments or decrements a count value at a predetermined clock in response to a count start signal externally supplied; a signal conversion circuit which converts the count value in the counter into an analog signal displaying intensity corresponding to the count value and outputs the analog signal as an output signal; a signal generation circuit which generates, based on the output signal from the signal conversion circuit and brightness data externally specified to corresponding one of the plurality of LEDs, an analog signal displaying intensity corresponding to a product of the output signal and the corresponding brightness data, and outputs the generated analog signal; and a driving circuit for driving corresponding one of the plurality of LEDs according to the analog signal output from the signal generation circuit, to thereby gradually and simultaneously modulate brightness levels of the plurality of LEDs according to the count value.

According to a further aspect, the present invention also provides an LED control circuit for controlling a plurality of LEDs with different emission colors comprising, with respect to each of the plurality of LEDs, a counter which increments or decrements a count value at a predetermined clock in response to a count start signal externally supplied; a signal conversion circuit which converts brightness data externally specified to corresponding one of the plurality of LEDs into an analog signal displaying intensity corresponding to the brightness data and then outputs the analog signal as an output signal; a signal generation circuit which generates, based on the output signal from the signal conversion circuit and the count value provided from the counter, an analog signal displaying intensity corresponding to a product of the corresponding output signal and the count value, and outputs the generated analog signal, and a driving circuit for driving corresponding one of the plurality of LEDs according to the analog signal output from the signal generation circuit, to thereby gradually and simultaneously modulate the brightness levels of the plurality of LEDs according to the count value.

BRIEF DESCRIPTION OF THE DRAWINGS

Preferred embodiments of the present invention will be described in detail based on the following figures, wherein.

DESCRIPTION OF THE PREFERRED EMBODIMENTS

Figure 1:
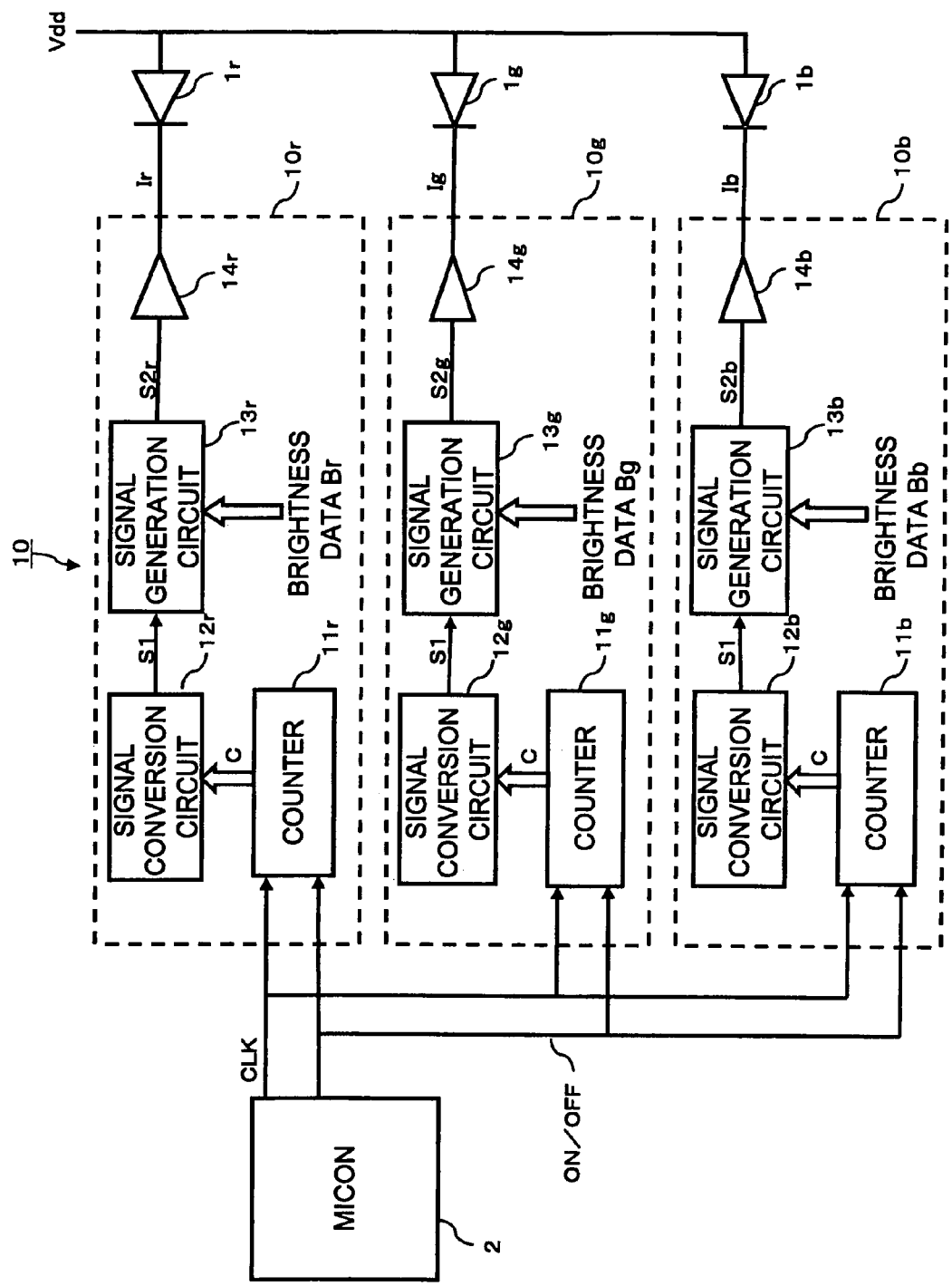
FIG. 1 is a circuit block diagram showing a configuration of an LED control circuit according to a first embodiment of the present invention.

Referring to the drawings, preferred embodiments of the present invention will be described below.

Embodiment 1

FIG. 1 is a circuit block diagram showing a configuration of an LED control circuit 10 according to a first embodiment of the present invention. The LED control circuit 10 is incorporated in a cellular phone or a PHS to control turning on and off of three color LEDs in response to receipt of an incoming call and a text message. In particular, the LED control circuit 10 is designed to realize a fade-in and a fade-out of halftone color light. Here, the fade-in means that an LED becomes gradually brighter from a turned-off state to a predetermined lighting state, while the fade-out means that the LED becomes gradually darker from the lighting state to the turned-off state.

In FIG. 1, the input terminal of the LED control circuit 10 is connected to a microcomputer (micon) 2, while its output terminals are connected to a red LED 1r, green LED 1g, and blue LED 1b. The LED control circuit 10 comprises an RLED control circuit 10r for controlling the LED 1r, GLED control circuit 10g for controlling the LED 1g, and a BLED control circuit 10b for controlling the LED 1b. The RLED, GLED, and BLED control circuits 10r, 10g, and 10b have almost the same structure including counters 11r, 11g, and 11b, signal conversion circuits 12r, 12g, and 12b, signal generation circuits 13r, 13g, and 13b, and driving circuits 14r, 14g, and 14b, respectively.

Hereinafter, "r", "g", and "b" suffixes for representing colors will be omitted as appropriate from reference characters of components, signals, and the like, and "LED 1r", "LED 1g", and "LED 1b" will be collectively referred to as "LED 1".

The counter 11 is a circuit configured to increment or decrement a count value C based on a predetermined clock CLK supplied from the micon 2 in response a count start signal from the micon 2. In the present Embodiment 1, the counter 11 is a 4-bit up-down counter. The counter 11 receives, as the count start signal, a turn-on start signal (hereinafter referred to as an "ON signal") for instructing initiation of the LED 1 or a turn-off start signal (hereinafter referred to as an "OFF signal") for instructing shutoff of the LED 1. When the ON signal is supplied to the counter 11, the counting is started from a count value C0 corresponding to a turned-off state to a count value C1 corresponding to a predetermined lighting state. When the OFF signal is supplied, on the other hand, the counting is started from the count value C1 corresponding to the predetermined lighting state to the count value C0 corresponding to the turned-off state. More specifically, the counter 11 increments, in response to the ON signal, from the count value C0 of "0000" (0 in decimal form) to the count value C1 of "1111" (15 in decimal form) and maintains the count value C1 after the completion of counting up. On the other hand, the counter 11 decrements, in response to the OFF signal, from the count value C1 of "1111" to the count value C0 of "0000" and maintains the count value C0 after the completion of counting down.

The signal conversion circuit 12 converts the count value (a digital signal) from the counter 11 into an analog signal S1 which displays intensity corresponding to the count value and outputs the converted analog signal S1 as an output signal. It should be noted that, here, the analog signal S1 may be a PWM signal which is an analog signal in the broad sense as well as being an analog current signal or an analog voltage signal being an analog signal in the narrow sense. Accordingly, the signal conversion circuit 12 may be configured, for example, by a DA conversion circuit (a DA converter) for converting a digital signal into an analog current signal or an analog voltage signal in accordance with the magnitude of the digital signal, or by a PWM circuit for converting a digital signal into a PWM signal having a duty factor in accordance with the magnitude of the digital signal. Further, the relationship between the count value C and the intensity (a current value, a voltage value, a duty factor) of the analog signal S1 may be linear or nonlinear.

The signal generation circuits 13r, 13g, and 13b generate, based on the analog signal S1 output from the signal conversion circuits 12r, 12g, and 12b and brightness data Br, Bg, and Bb input from the micon 2, analog signals S2r, S2g, and S2b which display intensity corresponding to products of the analog signal S1 and the brightness data Br, Bg, and Bb; and output the generated analog signals S2r, S2g, and S2b, respectively.

The brightness data Br, Bg, and Bb represents brightness levels of the LED 1r, 1g, and 1b, respectively, and may be provided with different values. By varying the values of the brightness data Br, Bg, and Bb, the three color LEDs 1 are operated so as to emit light in differing luminance patterns, thereby enabling the three color LEDs 1 to realize the multicolor multi-gradation representation. Here, the brightness data Br, Bg, and Bb is 4-bit digital data assigned by the micon 2.

Similarly to the analog signal S1, the analog signal S2 may be an analog current signal or an analog voltage signal, or, alternatively, may be a PWM signal. Further, there may be nonlinear or linear relationship between the product of the analog signal S1 and the brightness data B and the intensity (a current value, a voltage value, a duty factor) of the analog signal S2.

The driving circuits 14r, 14g, and 14b drive the LEDs 1r, 1g, and 1b according to the analog signals S2r, S2g, and S2b output from the signal generation circuits 13r, 13g, and 13b, respectively. Specifically, the driving circuits 14r, 14g, and 14b are implemented by output buffer circuits for drawing or sending currents to supply drive currents Ir, Ig, and Ib in accordance with the magnitude of the analog signals S2r, S2g, and S2b to the LEDs 1r, 1g, and 1b, respectively.

FIGS. 2(A) to 2(E) are time charts showing operation of the LED control circuit 10 according to Embodiment 1 in which changes in ON/OFF signal, count value C, analog signal S1, analog signal S2, and drive current I are represented in FIG. 2(A), 2(B), 2(C), 2(D), and 2(E), respectively. Referring to FIGS. 1 and 2(A) to 2(E), operation of the LED control circuit 10 of Embodiment 1 will be described below, with reference to an example wherein the three color LEDs 1 are operated to fade in upon receipt of a text message and to fade out after a predetermined time has elapsed.

Upon receipt of a text message, the micon 2 reads the brightness data Br, Bg, and Bb associated with the receipt of text message from a memory (not illustrated) and provides the read brightness data to the corresponding signal generation circuits 13r, 13g, and 13b, in order to cause the three color LEDs 1 to emit light of colors associated with the receipt of text message. Then, the micon 2 simultaneously outputs the ON signal to the three counters 11r, 11g, and 11b. Here, "1000" (8 in decimal form), "0100" (4 in decimal form), and "0010" (2 in decimal form) are adopted as the brightness data Br, Bg, and Bb, respectively.

Figure 2:
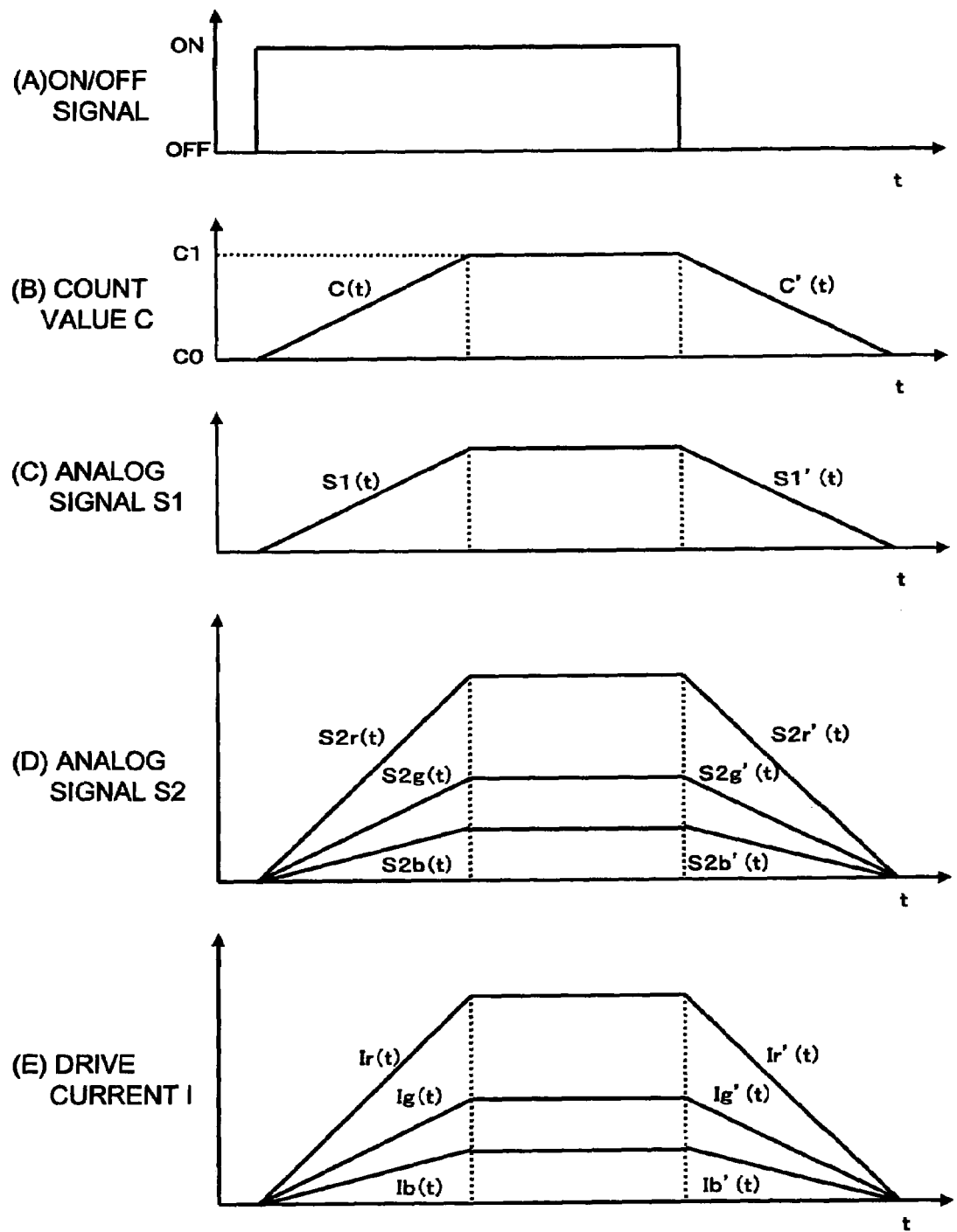
FIGS. 2(A) to 2(E) are time charts showing operation of the LED control circuit according to the first embodiment.

When the ON signal is supplied, the counter 11 increments from the count value C0 ("0000") to the count value C1 ("1111") according to the clock CLK output from the micon 2. FIG. 2(B) shows count value C(t). Its should be noted that the count values C(t) changes in a stepwise manner in actuality, but is practically represented by an approximated straight line in FIG. 2(B). The count value C is output from the counter 11 to the signal conversion circuit 12.

The signal conversion circuit 12 converts the count value C supplied from the counter 11 into the analog signal S1 having the magnitude equivalent to the count value C. FIG. 2(C) shows the analog signal S1(t) obtained here, which is given by the expression $S1(t) = \alpha \cdot C(t)$ (where $\alpha$ is a constant). The analog signal S1 is output from the signal conversion circuit 12 to the signal generation circuit 13.

The signal generation circuits 13r, 13g, and 13b generate, based on the analog signal S1 provided from the signal conversion circuit 12 and the brightness data Br, Bg, and Bb supplied from the micon 2, the analog signals S2r, S2g, and S2b having the magnitude equivalent to products of the analog signal S1 and the brightness data Br, Bg, and Bb, respectively. FIG. 2(D) shows the analog signals S2r(t), S2g(t), and S2b(t) obtained here, which are given by the expressions $S2r(t) = \beta \cdot Br \cdot S1(t)$, $S2g(t) = \beta \cdot Bg \cdot S1(t)$, and $S2b(t) = \beta \cdot Bb \cdot S1(t)$ (where $\beta$ is a constant). The analog signals S2r, S2g, and S2b are output from the signal generation circuits 13r, 13g, and 13b to the drive circuits 14r, 14g, and 14b, respectively.

The drive circuits 14r, 14g, and 14b supply drive currents Ir, Ig, and Ib in accordance with the magnitude of the analog signals S2r, S2g, and S2b to the LEDs 1r, 1g, and 1b, respectively. FIG. 2(E) shows the drive currents Ir(t), Ig(t), and Ib(t), which are given by the expressions $Ir(t) = \gamma \cdot S2r(t)$, $Ig(t) = \gamma \cdot S2g(t)$, and $Ib(t) = \gamma \cdot S2b(t)$ (where $\gamma$ is a constant). Accordingly, they are expressed as follows: $Ir(t) = A \cdot Br \cdot C(t)$, $Ig(t) = A \cdot Bg \cdot C(t)$, and $Ib(t) = A \cdot Bb \cdot C(t)$ (where $A = \alpha \cdot \beta \cdot \gamma$).

The LEDs 1r, 1g, and 1b are operated to emit light by the drive currents Ir, Ig, and Ib supplied from the driving circuits 14r, 14g, and 14b. Because the drive currents Ir, Ig, and Ib change as shown in FIG. 2(E), the LEDs 1r, 1g, and 1b become gradually brighter from the turned-off state until they completely enter a desired lighting state simultaneously. As can be seen from FIG. 2(E), during and after the completion of fade-in, the ratio of the drive currents Ir, Ig, and Ib is in continual agreement with the ratio of the brightness data Br, Bg, and Bb, and remains constant.

After a predetermined time has elapsed since the completion of fade-in, the micon 2 simultaneously outputs the OFF signal to the three counters 11. Upon receipt of the OFF signal, the counters 11 decrement from the count value C1 ("1111") to the count value C0 ("0000") according to the clock CLK output from the micon 2. FIG. 2(B) shows the count value C'(t) obtained here in the counters 11. It should be noted that the count value C'(t) changes in a stepwise manner in actuality, but is practically represented by an approximated strait line in FIG. 2(B). The count value C is output from the counter 11 to the signal conversion circuit 12.

Subsequent operation is similar to that at fade-in. Specifically, the signal conversion circuit 12 converts the count value C into the analog signal S1. The signal generation circuit 13 generates the analog signal S2 from the analog signal S1 and the brightness data B. The driving circuit 14 supplies the drive current I in accordance with the analog signal S2 to the LED 1. FIGS. 2(C), 2(D), and 2(E) show the analog signal S1'(t), analog signals S2r'(t), S2g'(t), and S2b'(t), and drive currents Ir'(t), Ig'(t), and Ib'(t) obtained here.

The LEDs 1r, 1g, and 1b are operated to emit light in response to the drive currents Ir, Ig, and Ib supplied from the driving circuits 14r, 14g, and 14b. Because the drive currents Ir, Ig, and Ib vary as shown in FIG. 2(E), the LEDs 1r, 1g, and 1b become gradually darker from the predetermined lighting state and enter the turned-off state simultaneously. As can be seen from FIG. 2(E), during fade-out operation, the ratio of the drive currents Ir, Ig, and Ib is in continual agreement with the ratio of the brightness data Br, Bg, and Bb, and remains constant.

As described above, according to the present embodiment, after incrementing or decrementing the count value C by the counter 11, converting the count value C into the analog signal S1, and generating the analog signals S2r, S2g, and S2b in accordance with the products of the analog signal S1 and the brightness data Br, Bg, and Bb, the LEDs 1r, 1g, and 1b are driven according to the obtained analog signals S2r, S2g, and S2b. In this manner, the fade-in or the fade-out can be performed while maintaining the brightness ratio of a plurality of LEDs at a desirable ratio to a certain extent. A specific brightness changing period for each of the LEDs 1 is an interval in which the count value C in the counter 11 changes from C0 to C1, or changes from C1 to C0. Therefore, irrespective of settings of the brightness data Br, Bg, and Bb, the fade-ins or the fade-outs of the three color LEDs 1 all begin and end simultaneously, thereby preventing situations in which the brightness of one of the LEDs 1 varies disproportionaly during a fade-in operation, or that one of the LEDs 1 will remain on during a fade-out operation.

Although examples involving fade-in and fade-out have been described, the above-described operation may be performed to gradually increase or decrease brightness of a plurality of LEDs 1 while maintaining the lighting state of the plurality of LEDs 1. For example, the counter 11 may be incremented from a count value C3 "0010" to a count value C4 "1000" in response to the count start signal. In this case, the brightness of the plurality of LEDs 1 will change from a level corresponding to the count value C3 to a level corresponding to the count value C4. Also in such operation, the effects similar to those described above can be obtained. In other words, according to Embodiment 1, the brightness of a plurality of LEDs can gradually be changed all together at a time, while maintaining the brightness ratio of the plurality of LEDs at a desirable ratio to a certain extent.

Referring to Configuration Examples 1 to 4, the configuration of the LED control circuit 10 according to Embodiment 1 will be described in further detail below. Because the RLED control circuit 10r, the GLED control circuit 10g, and BLED control circuit 10b have almost the same structure, the RLED control circuit 10r is only described here. To simplify explanation, a proportionality constant and the like are omitted as appropriate below.

CONFIGURATION EXAMPLE 1

Figure 3:
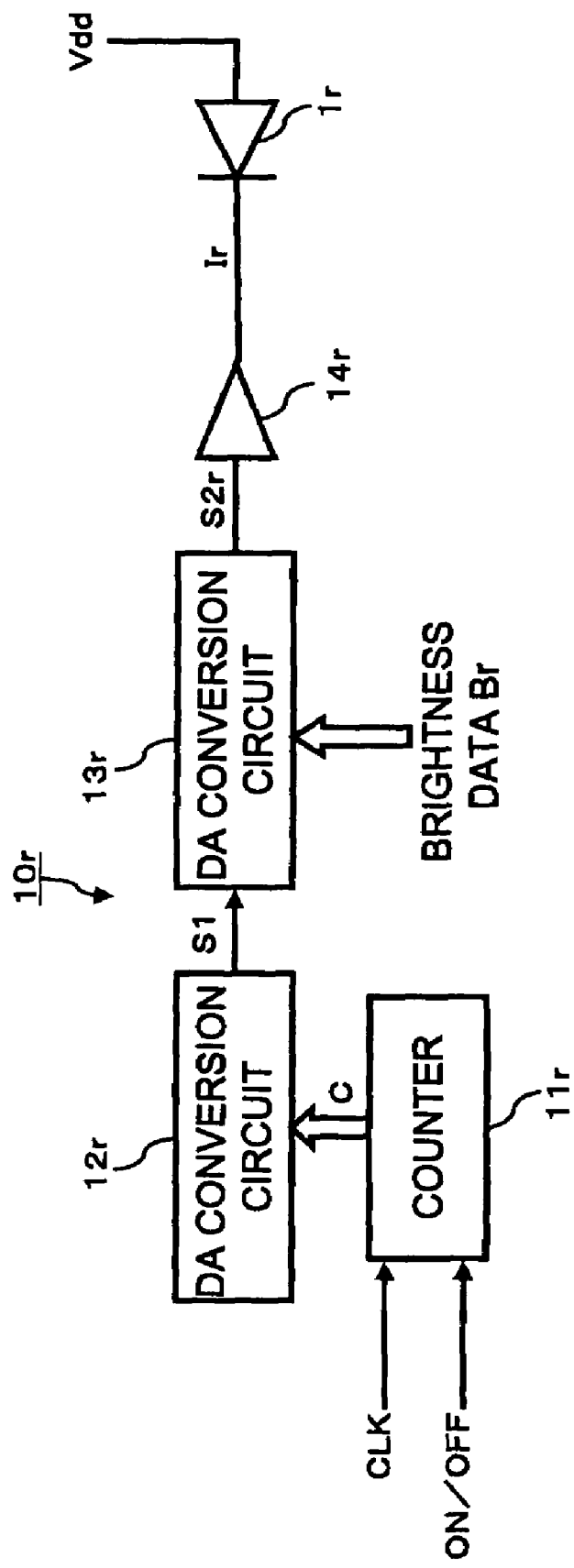
FIG. 3 is a circuit block diagram showing an RLED control circuit according to configuration example 1.

FIG. 3 is a circuit block diagram of the RLED control circuit 10r according to Configuration Example 1. In this example, the signal conversion circuit 12r and the signal generation circuit 13r are both configured as a DA conversion circuit for converting an input digital signal into an analog current signal.

Upon receipt of the count value C from the counter 11r, the signal conversion circuit 12r multiplies a reference current Iref by the count value C and outputs a current C·Iref as the analog signal S1.

The signal generation circuit 13r converts the brightness data Br into an analog current signal using the current C·Iref supplied from the signal conversion circuit 12r as a reference current for DA conversion. Specifically, the signal generation circuit 13r multiplies the reference current C·Iref by the brightness data Br and outputs the resultant current Br·C·Iref as the analog signal S2r.

CONFIGURATION EXAMPLE 2

Figure 4:
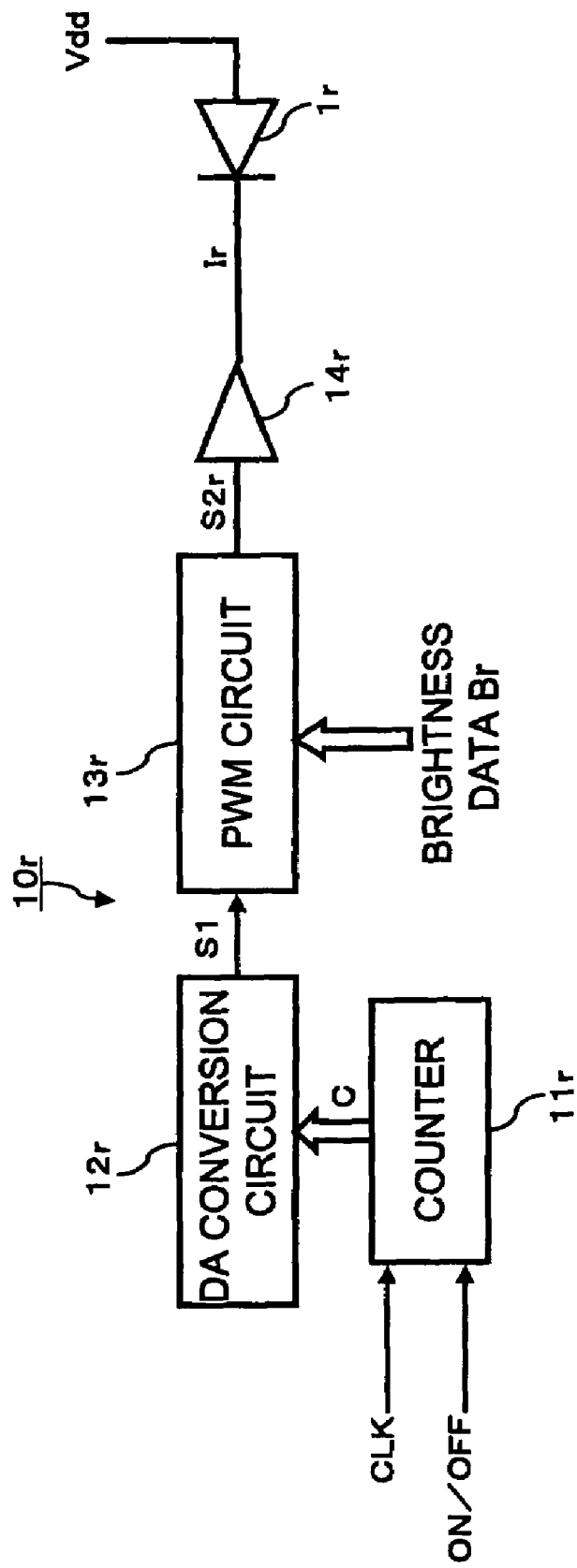
FIG. 4 is a circuit block diagram showing an RLED control circuit according to configuration example 2.

FIG. 4 is a circuit block diagram of an RLED control circuit 10r according to Configuration Example 2. In this example, the signal conversion circuit 12r is a DA conversion circuit for converting an input digital signal into an analog current signal, and the signal generation circuit 13r is a PWM circuit for converting an input digital signal into a PWM signal.

Upon receipt of the count value C from the counter 11, the signal conversion circuit 12r multiplies the reference current Iref by the count value C and outputs the resultant current C·Iref as the analog signal S1.

The signal generation circuit 13r converts the brightness data Br (4-bit data, 0~15 in decimal form) into a PWM signal using the current C·Iref supplied from the signal conversion circuit 12r as a reference current for PWM. Specifically, the signal generation circuit 13r outputs a pulse current having a current amplitude of C·Iref and a duty factor of Br/15 as the analog signal S2r. Here, it should be noted that an average current value of the analog signal S2r is C·Iref·Br/15.

CONFIGURATION EXAMPLE 3

Figure 5:
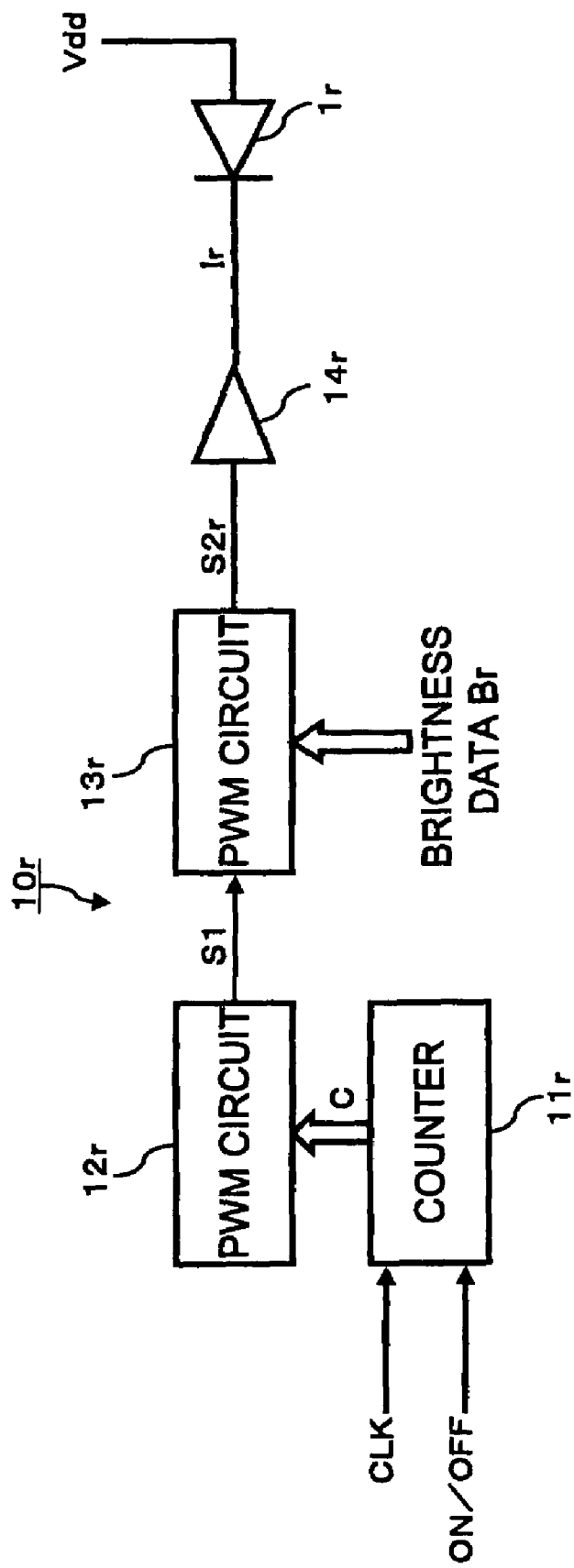
FIG. 5 is a circuit block diagram showing an RLED control circuit according to configuration example 3.

FIG. 5 is a circuit block diagram showing an RLED control circuit 10r according to Configuration Example 3. In this example, the signal conversion circuit 12r and the signal generation circuit 13r are both configured as a PWM circuit for converting an input digital signal into a PWM signal.

Upon receipt of the count value C (4-bit data, 0~15 in decimal form) from the counter 11r, the signal conversion circuit 12r outputs a pulse current having a current amplitude equal to the reference current value Iref and having a duty factor of C/15 as the analog signal S1. Here, the average current value of the analog signal S1 is (C/15)·Iref.

The signal generation circuit 13r converts the brightness data Br (4-bit data, 0~15 in decimal form) into a PWM signal using the pulse current supplied from the signal conversion circuit 12r as the reference current for PWM. Specifically, the signal generation circuit 13r outputs a pulse current having a current amplitude of Iref and a duty factor of (Br/15)·(C/15) as the analog signal S2r. Here, the average current value of the analog signal S2r is (Br/15)·(C/15)·Iref. Further, it is preferred that the signal conversion circuit 12r have a PWM cycle completely different from that of the signal generation circuit 13r.

CONFIGURATION EXAMPLE 4

Figure 6:
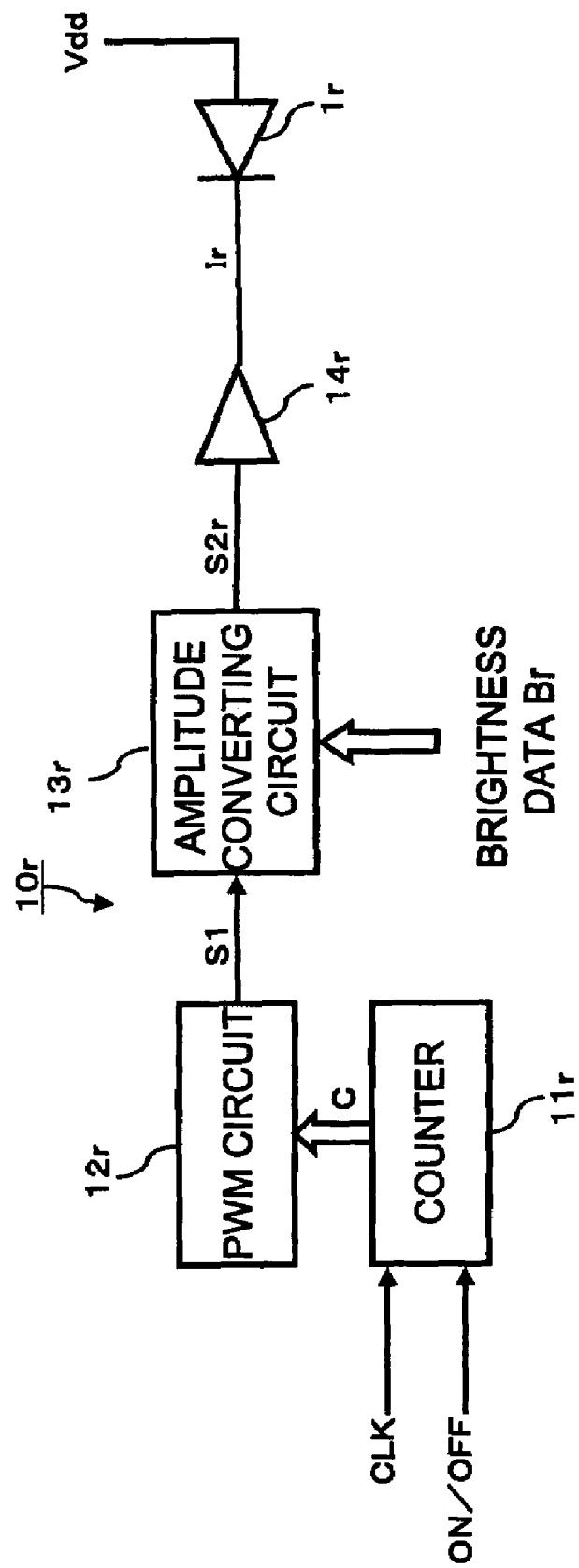
FIG. 6 is a circuit block diagram showing an RLED control circuit according to configuration example 4.

FIG. 6 is a circuit block diagram showing an RLED control circuit 10r according to Configuration Example 4. In FIG. 6, the signal conversion circuit 12r is a PWM circuit which, upon receipt of the count value C from the counter 11r, outputs a pulse current having a current amplitude equal to the reference current value Iref and a duty factor of C/15 as the analog signal S1.

The signal generation circuit 13r is an amplitude converting circuit for multiplying the amplitude of the pulse current supplied from the signal conversion circuit 12r by a value of Br to obtain a pulse current (current amplitude=Br·Iref, duty factor=C/15) and then outputting the obtained pulse current as the analog signal S2r. Here, the average current value of the analog signal S2r is Br·(C/15)·Iref.

Circuit Configuration

Next, a specific example circuit configuration of the RLED control circuit 10r according to Configuration Example 1 will be described in detail.

Figure 7:
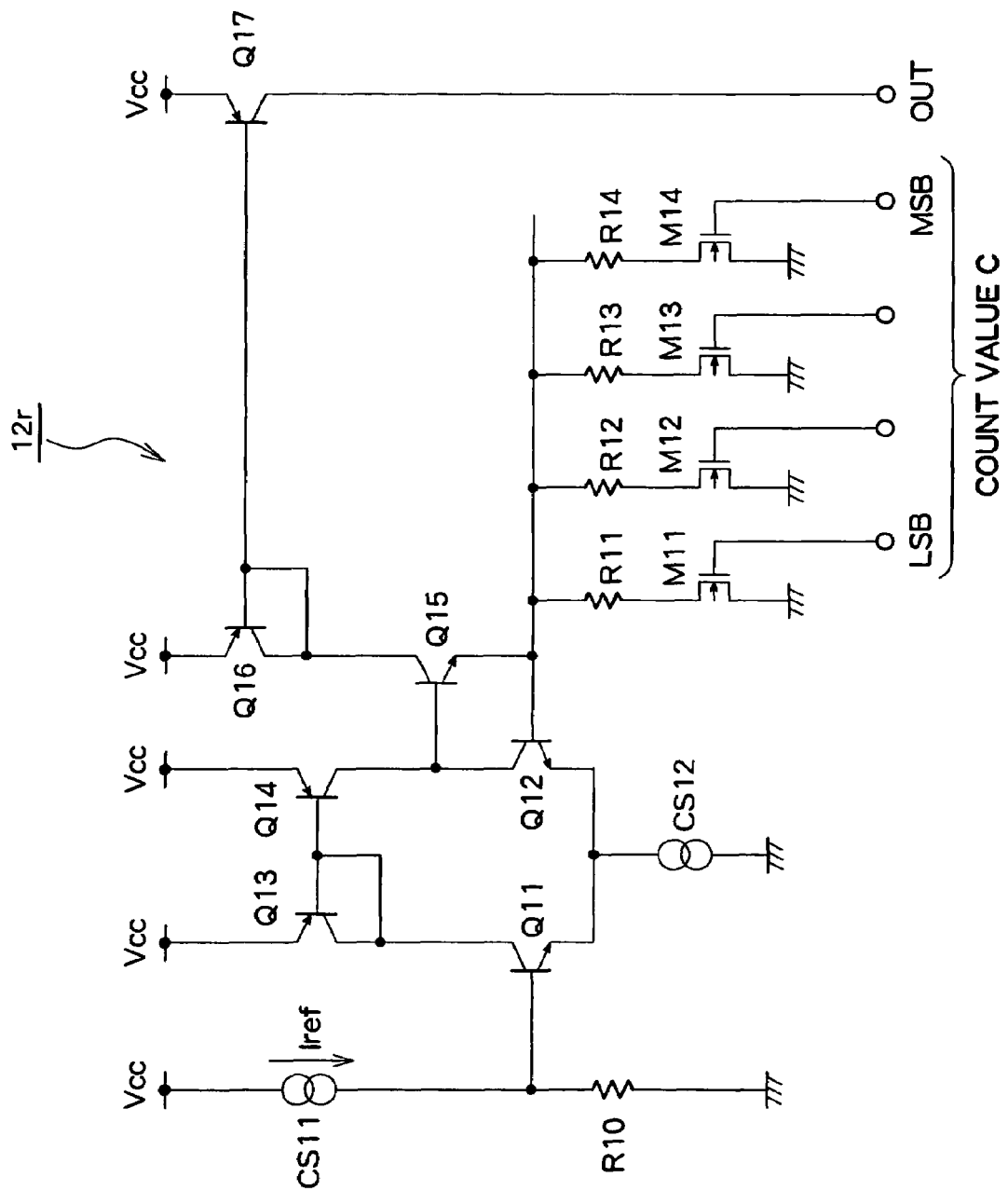
FIG. 7 is a circuit diagram showing an example of a signal conversion circuit of configuration example 1.

FIG. 7 is a circuit diagram showing an example of the signal conversion circuit 12r according to Configuration Example 1. In the configuration shown in FIG. 7, a constant current source CS11 for feeding the reference current Iref and a resistance R10 (whose resistance value is Ra) are connected in series between a power source Vcc and a ground, and a junction provided between the constant current source CS11 and the resistance R10 is connected to a base of an NPN transistor Q11. Accordingly, an electric potential at the base of the transistor Q11 can be expressed as Ra·Iref (hereinafter referred to as "Vref").

The NPN transistors Q11 and Q12 constitute a differential pair of a differential amplifier. Further, PNP transistors Q13 and Q14 are connected between collectors of the transistors Q11 and Q12 and power sources Vccs, respectively, to thereby constitute a current mirror circuit. Emitters of the transistors Q11 and Q12 have a common connection to be connected via a constant current source CS12 to a ground. Further, an NPN transistor Q15 is disposed between the collector and base of the transistor Q12 and the power source Vcc, to thereby constitute a negative feedback circuit for the differential amplifier. The bases of the transistors Q11 and Q12 are maintained at an equal electric potential by the negative feedback circuit and current mirror action of the transistors Q13 and Q14. Accordingly, the potential at the base of the transistor Q12 is Vref.

The base of the transistor Q12 is connected to one end of each of the resistors R11 to R14. The other ends of the resistors R11 to R14 are connected via respective n-channel MOS transistors M11 to M14 to respective grounds. The resistors R11 to R14 and the transistors M11 to M14 are configured to correspond to each bit of the count value C (4 bits), and resistance values of 8R, 4R, 2R, and R are assigned, in this order, to the resistors R11 to R14, while the transistor size ratio of the transistors M11 to M14 is 1:2:4:8. The transistors M11 to M14 are turned on and off according to corresponding bit signals of the count value C. Currents of Vref/8R, Vref/4R, Vref/2R, and Vref/R, i.e. currents in accordance with weights of the bits flow through the resistors R11 to R14 when their corresponding transistors M11 to M14 are turned on. Further, the resistor R11 corresponds to the lowest bit (LSB) of the count value C, and the resistor R14 corresponds to the highest bit (MSB) of the count value C.

A PNP transistor Q16 with a short-circuited base and collector is disposed between the collector of the transistor Q15 and the power source Vcc, and all of the current passing through all the resistors R11 to R14 is fed through the PNP transistor Q16. Because the transistor Q16 constitutes a current mirror circuit in conjunction with a PNP transistor Q17, a current equal to the current flowing through the transistor Q16, i.e. the total current passing through all the resistors R11 to R14 is fed through the transistor Q17, and is then output from a signal output terminal OUT as the analog current signal S1.

For example, when the count value C is "0001" (1 in decimal form), the MOS transistor M11 is turned on, thereby feeding the current Vref/8R through the resistor R11. Because the MOS transistors M12 to M14 are in the off state, no currents pass through the resistors R12 to R14. Consequently, Vref/8R is output from the signal output terminal OUT as the analog current signal S1.

Further, when the count value C is binary "1100" (12 in decimal form), for example, the MOS transistors M13 and M14 are turned on, thereby feeding the currents Vref/2R and Vref/R through the resistors R13 and R14. Because the MOS transistors M11 and M12 are in the off state, no currents pass through the resistors R11 and R12. Consequently, 12·(Vref/8R) is output from the signal output terminal OUT as the analog current signal S1.

In this manner, the signal conversion circuit 12r of this example converts the count value C into a current having the current value of C·(Vref/8R) and outputs the current.

Figure 8:
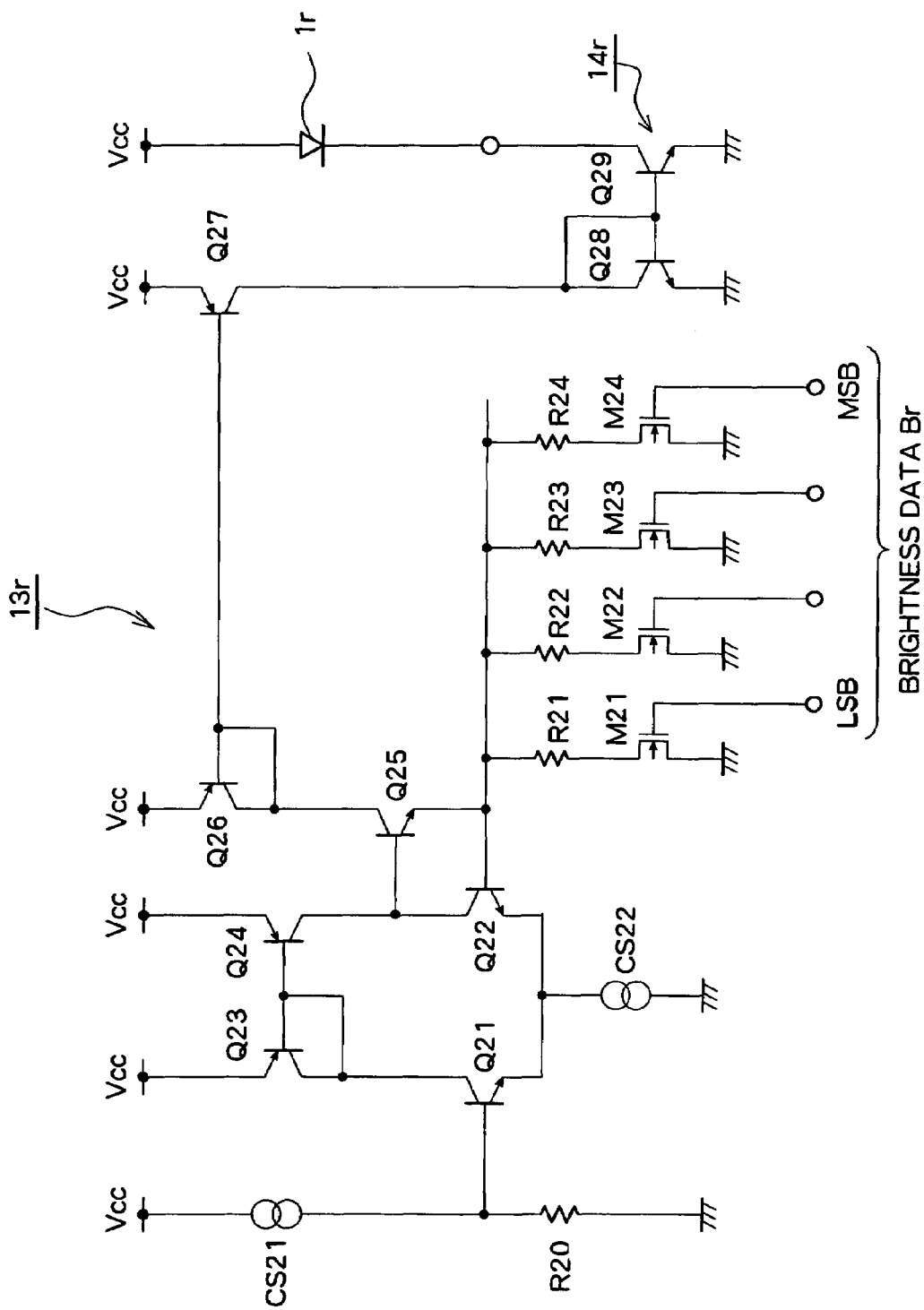
FIG. 8 is a circuit diagram showing an example of a signal generation circuit and a driving circuit of configuration example 1.

FIG. 8 is a circuit diagram showing an example of the signal generation circuit 13r and the driving circuit 14r according to Configuration Example 1. The signal generation circuit 13r includes a current source CS21 for feeding a reference current I'ref and a resistor R20 (whose resistor value is Rb) connected in series between the power source Vcc and the ground. Because a junction provided between the current source CS21 and the resistor R20 is connected to the base of an NPN transistor Q21, the electric potential at the base of the NPN transistor Q21 is Rb·I'ref (hereinafter referred to as V'ref). Here, the current source CS21 corresponds to the signal conversion circuit 12r, and the reference current I'ref of this example is C (Vref/8R).

The NPN transistors Q21 and Q22 constitute a differential pair of a differential amplifier. The PNP transistors Q23 and Q24 connected between collectors of the transistors Q21 and Q22 and the power sources Vccs constitute a current mirror circuit. The emitters of the transistors Q21 and Q22 have a common connection which is connected to the ground via a constant current source CS22. Further, an NPN transistor Q25 is disposed between the collector and base of the transistor Q22 and the power source Vcc, to thereby form a negative feedback circuit of the differential amplifier. Because the transistors Q21 and Q22 have an equal potential at the bases thereof by the negative feedback circuit and the current mirror action of the transistors Q23 and Q24, the base potential of the transistor Q22 is V'ref.

The base of the transistor Q22 is connected to one end of each of the resistors R21 to R24. The other ends of the resistors R21 to R24 are connected via respective n-channel MOS transistors M21 to M24 to respective grounds. The resistors R21 to R24 and the transistors M21 to M24 are configured to correspond to bits of the brightness data Br (4 bits), and resistance values of 8R', 4R', 2R', and R' are assigned, in this order, to the resistors R21, R22, R23, and R24, while the transistor size ratio of the transistors M21 to M24 is 1:2:4:8. The transistors M21 to M24 are turned on and off according to corresponding bit signals of the brightness data Br. Currents of V'Iref/8R', V'ref/4R', V'ref/2R', and V'ref/R', i.e. currents in accordance with weights of the bits flow through the resistors R21 to R24 when corresponding transistors M21 to M24 are turned on. Further, the resistor R21 corresponds to the lowest bit (LSB) of the brightness data Br, and the resistor R24 corresponds to the highest bit (MSB) of the brightness data Br.

A PNP transistor Q26 with a short-circuited base and collector is disposed between the collector of the transistor Q25 and the power source Vcc, and all current passing through all of the resistors R21 to R24 is fed through the PNP transistor Q26. Because the transistor Q26 constitutes a current mirror circuit in conjunction with a PNP transistor Q27, a current equal to the current flowing through the transistor Q26, i.e. the total current passing through all the resistors R21 to R24, is fed through the transistor Q27, and is then output as the analog current signal S2 to the driving circuit 14r.

In the above-described configuration, the signal generation circuit 13r converts the brightness data Br into a current having a current value of Br·(V'ref/8R') and outputs the obtained current similarly with the signal conversion circuit 12r.

In the driving circuit 14r, the NPN transistor Q28 is connected at an emitter thereof to a ground, and includes a base and a collector short-circuited, the collector being connected to the transistor Q27. Accordingly, a current of Br·(V'ref/8R') passes through the transistor Q28 which constitutes a current mirror circuit in conjunction with the NPN transistor Q29. An area of emitter of the transistor Q29 is N times that of emitter of the transistor Q28. The emitter of the transistor Q29 is grounded, and the LED 1r is connected between the collector of the transistor Q29 and the power source Vcc. Therefore, the LED 1r is supplied with a current of N·Br·(V'ref/8R'), i.e. C·Br·Ra·Rb·N·Iref/(64·R·R') as the drive current Ir.

Embodiment 2

Figure 9:
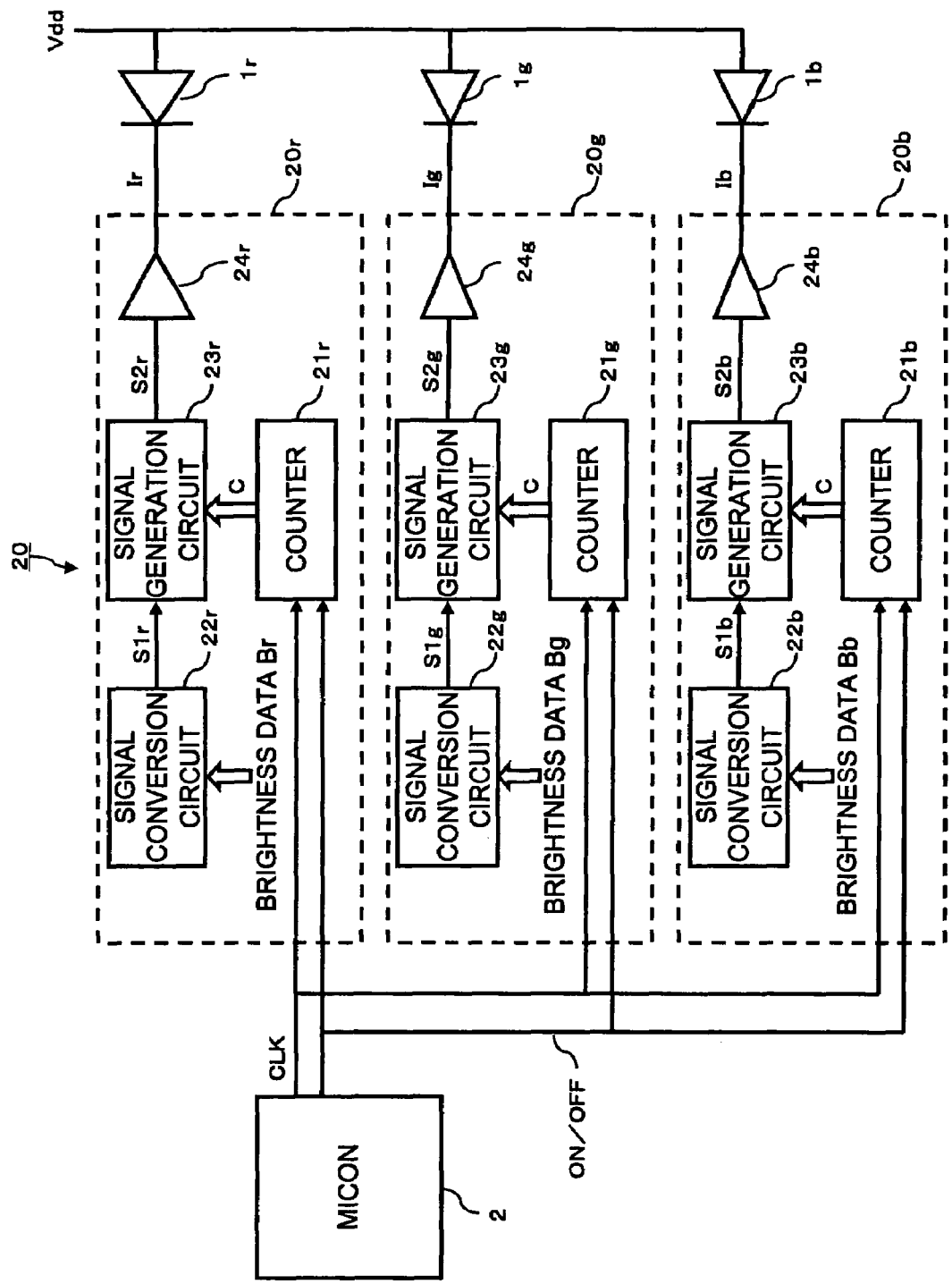
FIG. 9 is a circuit block diagram showing a configuration of an LED control circuit according to a second embodiment of the present invention.

FIG. 9 is a circuit block diagram showing a configuration of an LED control circuit 20 according to a second embodiment of the present invention. Embodiment 2 and Embodiment 1 differ primarily in that, in the LED control circuit 10 according to Embodiment 1, the count value C is input in the signal conversion circuit 12 and the brightness data B is input in the signal generation circuit 13, while in Embodiment 2 the brightness data B is input in the signal conversion circuit 22 and the count value C is input in the signal generation circuit 23. Although the LED control circuit 20 according to Embodiment 2 will be described in detail below, description about configurations and components similar to those described in Embodiment 1 are not repeated.

In FIG. 9, the LED control circuit 20 comprises an RLED control circuit 20r for controlling the LED 1r, a GLED control circuit 20g for controlling the LED 1g, and a BLED control circuit 20b for controlling the LED 1b. The RLED, GLED, and BLED control circuits 20r, 20g, and 20b have almost the same structures comprising the counters 21r, 21g, and 21b, the signal conversion circuits 22r, 22g, and 22b, the signal generation circuits 23r, 23g, and 23b, and the drive circuits 24r, 24g, and 24b, respectively.

The counter 21 is, similar to the counter 11, a circuit to increment or decrement the count value C according to a predetermined clock CLK provided from the micon 2 in response to the count start signal supplied from the micon 2.

The signal conversion circuits 22r, 22g, and 22b convert the brightness data Br, Bg, and Bb input from the micon 2 into the analog signals S1r, S1g, and S1b displaying intensities corresponding to the brightness data Br, Bg, and Bb and output the obtained analog signals S1r, S1g, and S1b. Here, the analog signal S1 may an analog current signal or an analog voltage signal, or alternatively may be a PWM signal as well. Accordingly, the signal conversion circuit 22 may be implemented by, for example, a DA conversion circuit (a DA converter) for converting a digital signal into an analog current signal or an analog voltage signal in accordance with the magnitude of the digital signal, or a PWM circuit for converting a digital signal into a PWM signal having a duty factor corresponding to the magnitude of the digital signal. Further, there may be a linear or nonlinear relationship between the brightness data B and the intensity (a current value, a voltage value, a duty factor) of the analog signal S1.

The signal generation circuits 23r, 23g, and 23b generate, based on the analog signals S1r, S1g, and S1b supplied from the signal conversion circuits 22r, 22g, and 22b and the count value C supplied from the counter 21, the analog signals S2r, S2g, and S2b displaying the intensity corresponding to products of the analog signals S1r, S1g, and S1b and the count value C, and output the generated analog signals S2r, S2g, and S2b, respectively. Similarly to the analog signal S1, the analog signal S2 may be a PWM signal as well as being an analog current signal or an analog voltage signal. Further, the relationship between the product of the analog signal S1 and the count value C and the intensity (a current value, a voltage value, a duty factor) of the analog signal S2 may be linear or nonlinear.

The driving circuits 24r, 24g, and 24b drive the LEDs 1r, 1g, and 1b, similarly as with the driving circuit 14, according to the analog signals S2r, S2g, and S2b output from the signal generation circuits 23r, 23g, and 23b, respectively.

FIGS. 10(A) to 10(E) show time charts of operation of the LED control circuit 20 according to Embodiment 2. FIGS. 10(A), 10(B), 10(C), 10(D), and 10(E) represent changes of the ON/OFF signal, the count value C, the analog signal S1, the analog signal S2, and the drive current I, respectively. Referring to FIGS. 9 and 10(A) to 10(E), operation of the LED control circuit 20 according to Embodiment 2 will be described below.

Upon receipt of a text message, the micon 2 reads out the brightness data Br, Bg, and Bb associated with the receipt of a text message from a memory which is not illustrated, and supplies the read brightness data Br, Bg, and Bb to the corresponding signal conversion circuits 22r, 22g, and 22b, respectively. Then, the micon 2 simultaneously outputs the ON signal to the three counters 21r, 21g, and 21b. Here, the brightness data Br, Bg, and Bb is assumed to be "1000" (8 in decimal form), "0100" (4 in decimal form), and "0010" (2 in decimal form), respectively.

Figure 10:
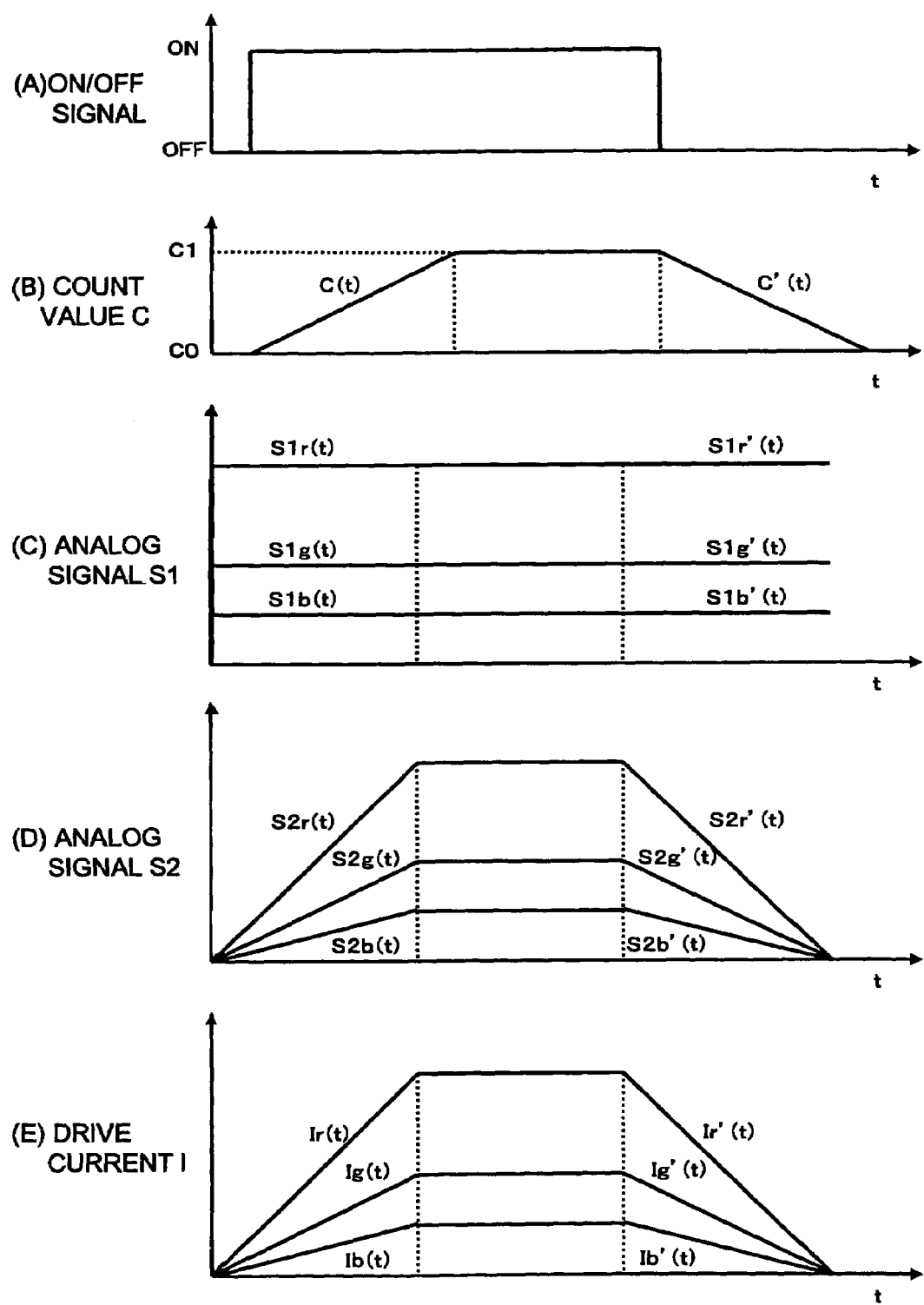
FIGS. 10(A) to 10(E) are time charts showing operation of the LED control circuit according to the second embodiment.

Upon receipt of the ON signal, the counter 21 increments from the count value C0 ("0000") to the count value C1 ("1111") according to the clock CLK from the micon 2. FIG. 10(B) shows the count value C(t) obtained here. The count value C is output from the counter 21 to the signal generation circuit 23.

The signal conversion circuits 22r, 22g, and 22b convert the brightness data Br, Bg, and Bb supplied from the micon 2 into the analog signals S1r, S1g, and S1b displaying the intensity corresponding to the brightness data Br, Bg, and Bb, respectively. FIG. 10(C) shows the analog signals S1r(t), S1g(t), and S1b(t) obtained here, which are expressed by the following equations: $S1r(t)=\alpha \cdot Br$, $S1g(t)=\alpha \cdot Bg$, and $S1b(t)=\alpha \cdot Bb$ (where $\alpha$ is a constant). The analog signal S1 is output from the signal conversion circuit 22 to the signal generation circuit 23.

The signal generation circuits 23r, 23g, and 23b generate, based on the count value C supplied from the counter 21 and the analog signals S1r, S1g, and S1b supplied from the signal conversion circuits 22r, 22g, and 22b, the analog signals S2r, S2g, and S2b having the magnitude equivalent to products of the count value C and the analog signals S1r, S1g, and S1b, respectively. FIG. 10(D) shows the analog signals S2r(t), S2g(t), and S2b(t) obtained here, which are expressed by the following equations: $S2r(t)=\alpha\cdot\beta\cdot Br\cdot C(t)$, $S2g(t)=\alpha\cdot\beta\cdot Bg\cdot C(t)$, and $S2b(t)=\alpha\cdot\beta\cdot Bb\cdot C(t)$ (where β is a constant). The analog signals S2r, S2g, and S2b are output from the signal generation circuits 23r, 23g, and 23b to the driving circuits 24r, 24g, and 24b, respectively.

The driving circuits 24r, 24g, and 24b provide drive currents Ir, Ig, and Ib in accordance with the magnitude of the analog signals S2r, S2g, and S2b supplied from the signal generation circuits 23r, 23g, and 23b to the LEDs 1r, 1g, and 1b, respectively. FIG. 10(E) shows the drive currents Ir(t), Ig(t), and Ib(t) obtained here, which are expressed by the following equations: $Ir(t)=\gamma\cdot S2r(t)$, $Ig(t)=\gamma\cdot S2g(t)$, and $Ib(t)=\gamma\cdot S2b(t)$ (where γ is a constant). In other words, the drive currents are $Ir(t)=A\cdot Br\cdot C(t)$, $Ig(t)=A\cdot Bg\cdot C(t)$, and $Ib(t)=A\cdot Bb\cdot C(t)$ (where $A=\alpha\cdot\beta\cdot\gamma$), and the drive current I equal to that provided in the LED control circuit 10 according to Embodiment 1 can be obtained.

Similarly to Embodiment 1, the LEDs 1r, 1g, and 1b are gradually increased in brightness, and enter a desired lighting state. Further, during and after the completion of fade-in, the ratio of the drive currents Ir, Ig, and Ib always agrees with the ratio of the brightness data Br, Bg, and Bb, and remains constant.

After a predetermined time has elapsed since the completion of the fade-in, the micon 2 simultaneously outputs the OFF signal to all the three counters 21. Upon receipt of the OFF signal, the counters 21 decrements from the count value C1 ("1111") to the count value C0 ("0000") according to the clock output from the micon 2. FIG. 10(B) shows the count value C'(t) decremented here in the counter 21. The count value C is output from the counter 21 to the signal generation circuit 23.

Operations of other circuits 22, 23, and 24 are similar to that described in connection with fade-in. Specifically, the signal conversion circuit 22 converts the brightness data B into the analog signal S1. The signal generation circuit 23 generates the analog signal S2 from the analog signal S1 and the count value C. The driving circuit 24 supplies the LED 1 with the drive current I responsive to the analog signal S2. FIGS. 10(C), 10(D), and 10(E) show the analog signals S1r'(t), S1g'(t), and S1b'(t), the analog signals S2r'(t), S2g'(t), and S2b'(t), and drive currents Ir'(t), Ig'(t), and Ib'(t) obtained here. In the fade-out, the drive current I equal to that obtained in the LED control circuit 10 of Embodiment 1 can be obtained similarly to fade-in operation.

Similarly to the previously-described LED control circuit 10, the LEDs 1r, 1g, and 1b are gradually decreased in brightness from the predetermined lighting state, and enter the desired turned-off state. Further, during fade-out operation, the ratio of the drive currents Ir, Ig, and Ib always agrees with the ratio of the brightness data Br, Bg, and Bb, and remains constant.

As has been described above, effects similar to those obtained in Embodiment 1 can also be obtained with Embodiment 2. Specifically, the brightness levels of a plurality of LEDs can gradually be changed all together at a time, while maintaining the brightness ratio of the plurality of LEDs at a desirable ratio to a certain extent.

Embodiment 3

An LED control circuit 30 according to a third embodiment of the present invention is almost identical to the LED control circuits 10 and 20 according to Embodiments 1 and 2, but is characterized in switching of clock frequencies used for counting between fade-in operation and fade-out operation. Although the LED control circuit 30 of Embodiment 3 will be described in detail below, components similar to those of Embodiments 1 and 2 are identified with the same reference numerals and description thereof is not repeated.

Figure 11:
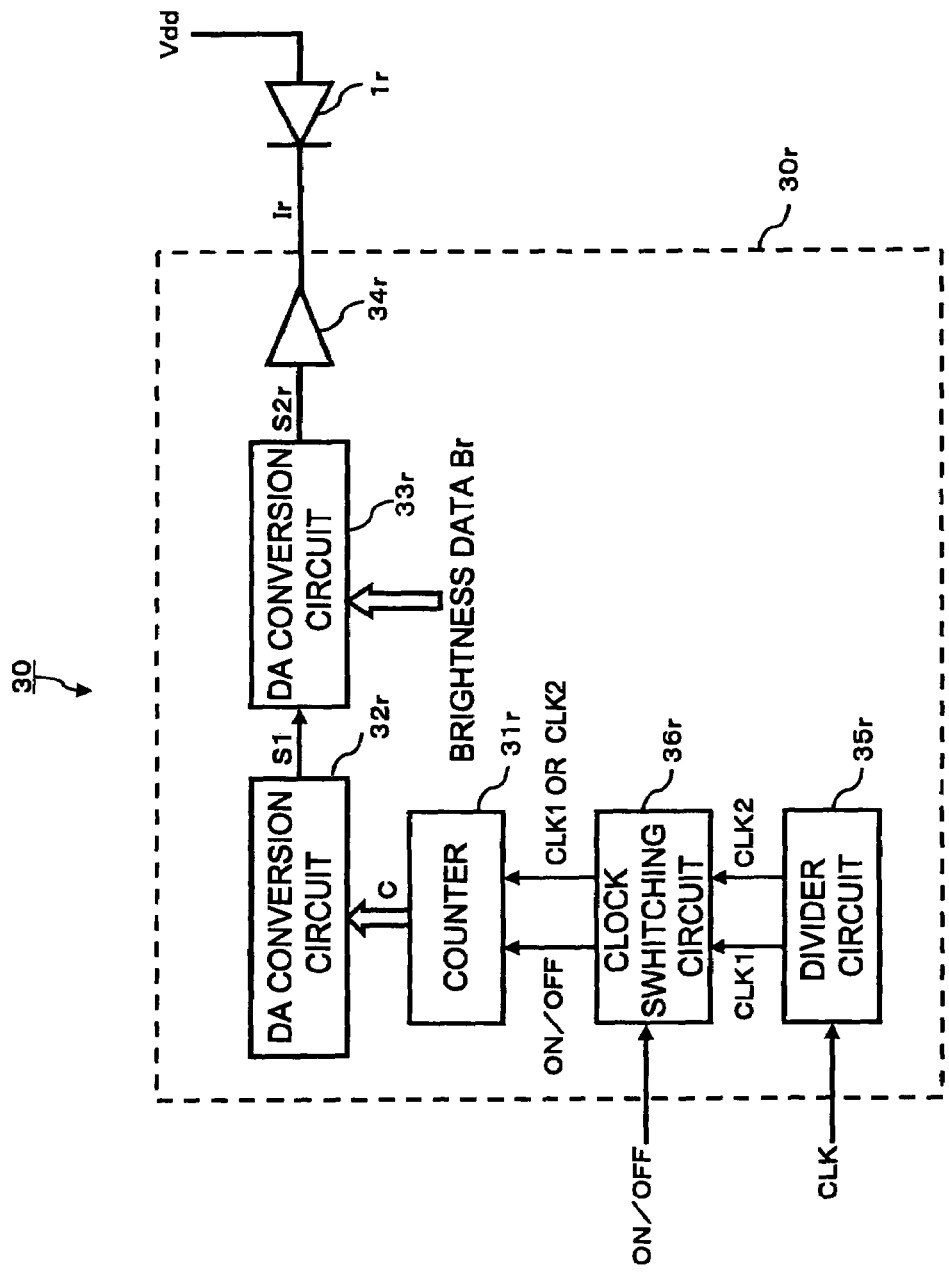
FIG. 11 is a circuit block diagram showing a configuration of an LED control circuit according to a third embodiment of the present invention.

FIG. 11 is a circuit block diagram showing the LED control circuit 30 according to Embodiment 3. In FIG. 11, GLED and BLED control circuits 30g and 30b are not depicted.

In the configuration of Embodiment 3, the RLED control circuit 30r comprises a divider circuit 35r and a clock switching circuit 36r in addition to a counter 31r, a signal conversion circuit 32r, a signal generation circuit 33r, and a driving circuit 34r.

The divider circuit 35r divides a reference clock CLK supplied from the micon 2 into two clocks to generate clocks CLK1 and CLK2 which differ in frequencies. The clocks CLK1 and CLK 2 generated by the divider circuit 35r are sent to the clock switching circuit 36r. The function of the divider circuit 35r may be incorporated in the micon 2.

When the ON signal is input from the micon 2, the clock switching circuit 36r supplies the clock CLK1 to the counter 31r in addition to supplying the ON signal to the counter 31r. When the OFF signal is input from the micon 2, on the other hand, the clock switching circuit 36r supplies the clock CLK2 to the counter 31r in addition to supplying the OFF signal to the counter 31r. Although the ON and OFF signals are supplied to the counter 31r by the clock switching circuit 36r in this embodiment, the signals may be supplied by the micon 2 to the counter 31r.

The counter 31r increments the count value C from C0 to C1 according to the clock CLK1 sent from the clock switching circuit 36r when the ON signal is input from the clock switching circuit 36r, and decrements the count value C from C1 to C0 at the clock CLK2 sent from the clock switching circuit 36r when the OFF signal is input.

Figure 12:
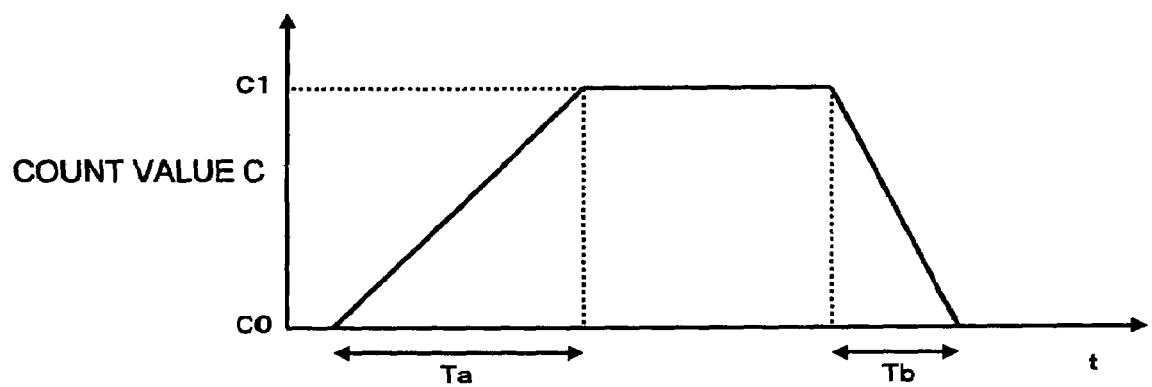
FIG. 12 is a diagram showing changes in a count value C in the third embodiment.
Figure 13:
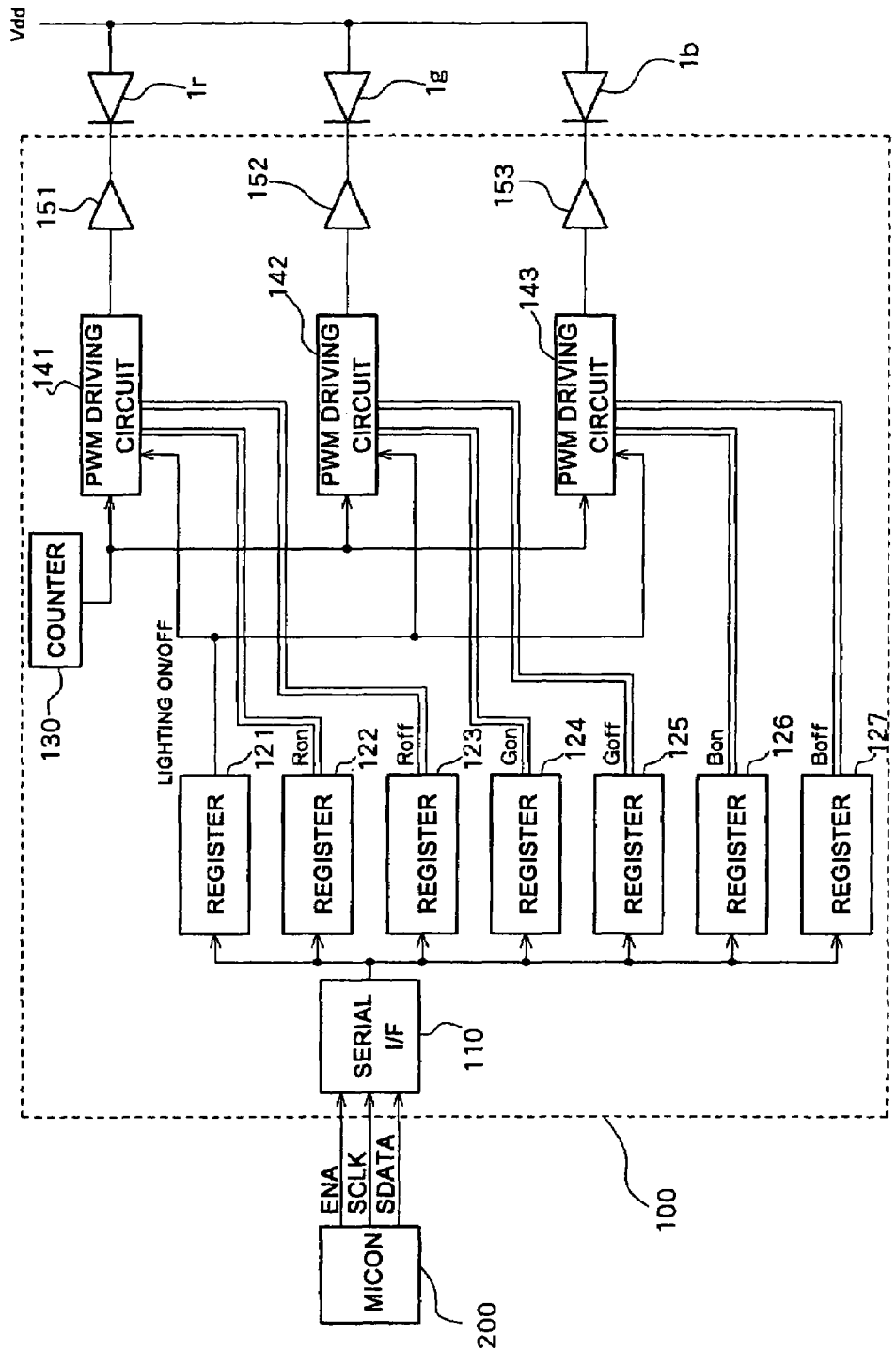
FIG. 13 shows an example of an LED control circuit in related art.
Figure 14:
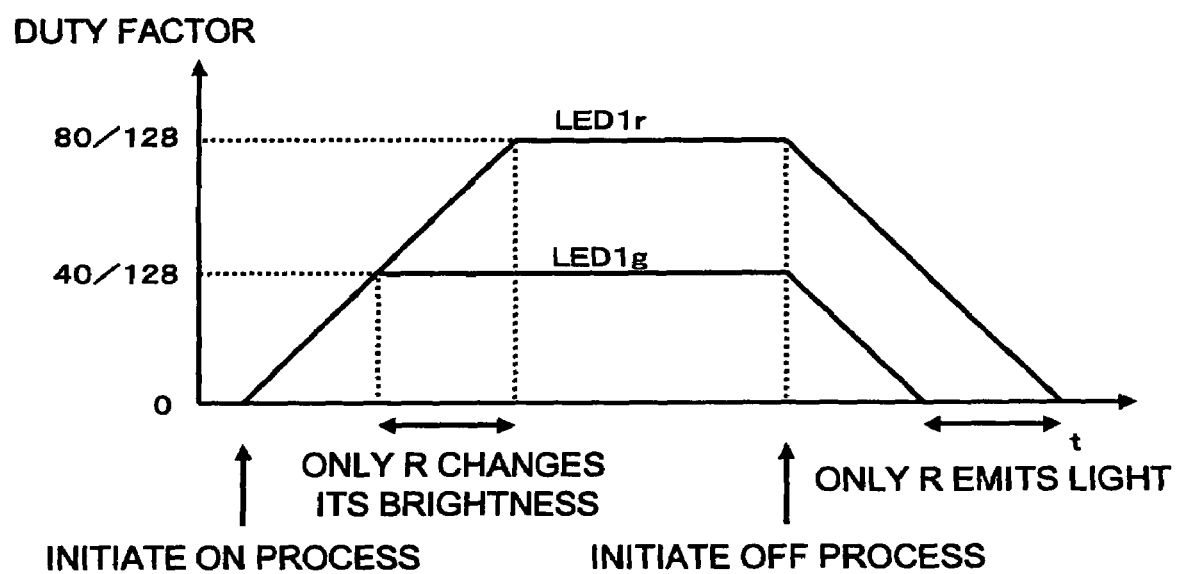
FIG. 14 shows a fade-in and a fade-out achieved by a conventional manner.

FIG. 12 shows changes in the count value C in Embodiment 3. In FIG. 12, the frequency of the clock CLK1 used for counting in fade-in operation is f, while that of the clock CLK2 used for counting in fade-out operation is 2·f. Therefore, the time interval Ta during which the brightness changes in fade-in operation is expressed as (C1−C0)/f, and a time interval Tb during which the brightness changes in fade-out operation is expressed as (C1−C0)/2f. As such, the brightness changes faster in fade-out operation than in fade-in operation. In plain language, the LED 1r becomes brighter relatively slowly to fade in, and becomes darker relatively quickly to fade out. It should be noted that although the LEDs 1g and 1b are not described here, they are operated similarly.

As has been described, the frequency of the clock used for counting in the fade-in and fade-out operations can be shifted, thereby enabling a change of the slope (speed) of changes in brightness level between the fade-in and fade-out operations. In this manner, variations of the fade-in operation and fade-out operation can be increased to realize a wide range of display operations of the LEDs 1.

Although the present invention has been described in relation to illustrative examples of preferred embodiments, it is to be understood that the invention is not limited to the specific embodiments but may be otherwise variously embodied within the scope of the following claims.

For example, the LED control circuit according to the present invention may be applied to various systems other than the cellular phone and PHS. Further, emission colors are not limited to the RGB colors, and the number of LEDs is not limited to three, and two or four or more LEDs may be used.

Although as described above the counter, the signal conversion circuit, the signal generation circuit, and the driving circuit are individually provided for each of the plurality of LEDs, some of LEDs with different emission colors may share the circuits as appropriate. In Embodiment 1, for example, the counters 11r, 11g and 11b may be implemented by a single counter, and the signal conversion circuits 12r, 12g, and 12b may also be implemented by a single signal conversion circuit.

What is claimed is:

1. An LED control circuit for controlling a plurality of LEDs with different emission colors comprising, with respect to each of the plurality of LEDs;
   a counter which increments or decrements a count value at a predetermined clock in response to a count start signal externally supplied;
   a signal conversion circuit which converts the count value from the counter into an analog signal displaying intensity corresponding to the count value and outputs the analog signal as an output signal;
   a signal generation circuit which generates, based on the output signal from the signal conversion circuit and brightness data externally specified to corresponding one of the plurality of LEDs, an analog signal displaying intensity corresponding to a product of the output signal and the corresponding brightness data, and outputs the generated analog signal; and
   a driving circuit which drives corresponding one of the plurality of LEDs according to the analog signal output from the signal generation circuit;
   wherein brightness levels of the plurality of LEDs are gradually and simultaneously changed according to the count value.

2. An LED control circuit according to claim 1, wherein:
   when a turn-on start signal is supplied as the count start signal, the counter counts from a count value corresponding to a turned-off state to a predetermined count value, and the plurality of LEDs are operated so as to become gradually brighter from the turned-off state to a predetermined lighting state according to the count value; and
   when a turn-off start signal is supplied as the count start signal, the counter counts from the predetermined count value to the count value corresponding to the turned-off state, and the plurality of LEDs are operated so as to become gradually darker from the predetermined lighting state to the turned-off state according to the count value.

3. An LED control circuit according to claim 2, wherein frequencies of the clock used for counting are switched between operation of counting from the count value corresponding to the turned-off state to the predetermined count value and operation of counting from the predetermine count value to the count value corresponding to the turned-off state.

4. An LED control circuit for controlling a plurality of LEDs with different emission colors comprising, with respect to each of the plurality of LEDs;
   a counter which increments or decrements a count value at a predetermined clock in response to a count start signal externally supplied;
   a signal conversion circuit which converts brightness data externally specified to corresponding one of the plurality of LEDs into an analog signal displaying intensity corresponding to the brightness data, and outputs the analog signal as an output signal;
   a signal generation circuit which generates, based on the output signal from the signal conversion circuit and the count-value from the counter, an analog signal displaying intensity corresponding to a product of the output signal and the count value, and outputs the generated analog signal; and
   a driving circuit which drives corresponding one of the plurality of LEDs according to the analog signal output from the signal generation circuit;
   wherein brightness levels of the plurality of LEDs are gradually and simultaneously changed according to the count value.

5. An LED control circuit according to claim 4, wherein:
   when a turn-on start signal is supplied as the count start signal, the counter counts from a count value corresponding to a turned-off state to a predetermined count value, and the plurality of LEDs are operated so as to become gradually brighter from the turned-off state to a predetermined lighting state; and
   when a turn-off start signal is supplied as the count start signal, the counter counts from the predetermined value to the count value corresponding to the turned-off state, and the plurality of LEDs are operated so as to become gradually darker from the predetermined lighting state to the turned-off state according to the count value.

6. An LED control circuit according to claim 5, wherein frequencies of the clock used for counting are switched between operation of counting from the count value corresponding to the turned-off state to the predetermined count value and operation of counting from the predetermined count value to the count value corresponding to the turned-off state.

* * * * *